United States Patent [19]
Lee

[11] Patent Number: 5,444,545
[45] Date of Patent: Aug. 22, 1995

[54] PICTURE SEARCH CONTROL APPARATUS IN A DIGITAL VIDEO TAPE RECORDER

[75] Inventor: Hyung-heui Lee, Kyungki, Rep. of Korea

[73] Assignee: Samsung Electronics Co., Ltd., Kyungki, Rep. of Korea

[21] Appl. No.: 24,016

[22] Filed: Mar. 1, 1993

[30] Foreign Application Priority Data

Feb. 29, 1992 [KR] Rep. of Korea ............... 92-3353

[51] Int. Cl.6 .................................................. H04N 5/783
[52] U.S. Cl. .................................... 358/335; 358/312; 360/10.1
[58] Field of Search .............. 358/335, 312; 360/33.1, 360/10.1, 35.1, 10.3, 14.3, 72.1, 72.2, 72.3; H04N 5/76, 5/783

[56] References Cited

U.S. PATENT DOCUMENTS

| | | | |
|---|---|---|---|
| 3,736,565 | 5/1973 | Sidline | 360/14.3 |
| 3,812,532 | 5/1974 | Crosser et al. | 360/72.3 |
| 4,484,235 | 11/1984 | Yokobori et al. | 360/10.3 |
| 4,956,725 | 9/1990 | Kozuki et al. | 360/14.3 |
| 5,060,077 | 10/1991 | Koya et al. | 358/335 |
| 5,126,852 | 6/1992 | Nishino et al. | 358/312 |
| 5,136,391 | 8/1992 | Minami | 358/312 |
| 5,140,435 | 8/1992 | Suzuhi et al. | 358/335 |
| 5,149,451 | 1/1993 | Takeshita et al. | 358/335 |
| 5,239,429 | 8/1993 | Hoshi | 360/72.1 |

*Primary Examiner*—Tommy P. Chin
*Assistant Examiner*—Huy Nguyen
*Attorney, Agent, or Firm*—Sughrue, Mion, Zinn, Macpeak & Seas

[57] ABSTRACT

A picture search control apparatus for use in digital video tape recorders is connected to a motor controller and between an inner decoder and an outer decoder. The apparatus comprises a mode selector which selects a reproduction mode, receives a field selection signal, controls a capstan motor in correspondence to the selected reproduction mode, and produces primary control signals necessary for delaying the picture data as well as data processor for logically combining the primary control signals supplied from the mode selector to produce a plurality of control signals, delaying the data signal supplied from the inner decoder so as to constitute a still picture in correspondence to the selected reproduction mode by the plurality of control signals, and supplying the delayed signal to the outer decoder.

18 Claims, 6 Drawing Sheets

PICTURE SEARCH CONTROL APPARATUS IN A DIGITAL VIDEO TAPE RECORDER

BACKGROUND OF THE INVENTION

The present invention relates to a digital video tape recorder (digital VTR), and more particularly to a picture search control apparatus capable of easily searching for a desired picture.

When images are reproduced while a video tape is traveling at a high speed in a conventional digital VTR, the data tracks recorded on the tape are occasionally incongruous with the scanning tracks of the VTR heads. Thus, the heads are unable to reproduce an image having good picture quality.

To overcome such a problem, the current level of technology for recording image data signals on tape does not employ a conventional sequential recording method. Instead, to obtain optimum image clarity when the picture is formed with a collection of data samples read out by the heads during a high speed reproduction, a recording method has been used in which the alignment of the recorded data is altered or data constituting a whole picture is included in tracks scanned by the heads during the high speed reproduction. For example, in a disclosure by Matsushita Electric Co., Ltd. of Japan (PCF patent No. WO 90/02401), the entire contents of a flag memory is initialized to "1" values, prior to recording the data in memory, to thereby maximize the error correction capability of the outer decoder and improve the picture quality. If such a method is utilized, while perfect picture quality may be unobtainable, the necessary picture quality capable for at least locating a user-specified picture can be obtained during high speed reproduction.

However, in a system utilizing such methods as that described above, the user suffers eye fatigue due to the rapid movement of the images generated by the high speed reproduction. In addition, when the reproduction speed is thus increased, the user may or may not accurately discriminate procession of the picture.

SUMMARY OF THE INVENTION

Therefore, it is an object of the present invention to provide a picture search control apparatus capable of easily searching for a desired picture, in which data recorded on a tape is controlled and reproduced so that the contents of the tape are jumped up at a predetermined interval during high speed reproduction, thereby providing a clean still image.

In the present invention a memory is provided for storing the two fields of a frame and providing the memory output to the display screen for a given period of time during which the tape is being played back at higher than normal speeds. For example, if 10× reproduction speed is selected (600 fields per second as opposed to normal playback of 60 fields per second), the tape speed is varied from normal to peak (10×) and back to normal over a two second time period, and this sequence is continuously repeated. Because of the nature of VTR recording and playback operations, when the tape is altered from normal speed but the drum head rotates normally, there will not be continuous coincedence of the head track and the tape track. In the latter example, however, coincidence will occur each time in the cycle that normal tape speed occurs. This will be every two seconds, or 1200 fields at the tape rate. Timing signals are generated to control the writing and reading of the tape output data into the two memories, such that only the fields tracked when normal speed is reached are written into memory, and then held and displayed as a still picture until the next normal tape speed sequence is reached.

To accomplish the above-mentioned object of the present invention, there is provided a picture search control apparatus for use in a digital video tape recorder having a capstan motor for running a tape, a motor controller for controlling the capstan motor, and a reproducer including a demodulator for demodulating compressed data signals read out from the tape via at least one head, an inner decoder for decoding the data signals supplied from the demodulator and checking whether or not errors are generated, to correct the errors within the correction capability and add an error flag if the errors are beyond the correction capability, an outer decoder for correcting the errors of the data signal supplied from the inner decoder with respect to an outer code block according to the error flag, a data reconstruction portion for reconstructing the compressed data signal supplied from the outer decoder into an original state, and a digital-to-analog converter for converting the digital image data signal supplied from the data reconstruction portion into an analog image signal, the picture search control apparatus comprising:

a mode selector for selecting a reproduction mode, controlling the motor controller in response to the selected reproduction mode, receiving a field selection signal, and producing primary control signals necessary for delaying the picture data; and a data processor for logically combining the primary control signals supplied from the mode selector to produce a plurality of control signals, delaying the data signal supplied from the inner decoder so as to constitute a still picture in correspondence to the selected reproduction mode by the plurality of control signals, and supplying the delayed signal to the outer decoder.

The above mode selector comprises a mode selection switch for selecting one among a plurality of reproduction modes, a comparator for comparing the field selection signal with a predetermined reference value (RV) signal and generating a predetermined pulse signal when they coincide with each other, and a divider for frequency-dividing the output of the comparator. Here, the RV signal input to the comparator may have 1/60th, 1/120th or 1/180th the frequency of the field selection signal. This specification assumes the frequency of the RV signal to be 1/60th that of the field selection signal. (The above frequency-divider may be composed of a divide-by-two chip, e.g., a 74LS163.)

The above data processor comprises memory means for storing the picture data which is supplied from the inner decoder, address generating means for generating a write address and a read address for the memory means, first inverting means for inverting the field selection signal, a first selector for receiving the write address and read address for the memory means so as to be selectively supplied to the memory means by the field selection signal and the output of the first inverting means, first logic means for logically multiplying the outputs of the comparator and the frequency-divider in the mode selector with the field selection signal, second inverting means for inverting the outputs of the first logic means, second logic means for logically multiplying the outputs of the comparator and the frequency-divider with the outputs of the second inverting means, a second selector for receiving the field selection signal, the output of the first inverting means and the outputs of the first logic means and the second logic means so as to be selectively supplied to the memory means by a control signal supplied from the mode selection switch SW among the above primary control signals, and a third selector for receiving the picture data signals supplied from the memory means so as to be selectively supplied to the outer decoder by the field selection signal.

The above address generating means comprises a write address generator for generating an address assigning an access location for a write operation of the memory means and a read address generator for generating an address assigning an access location for a read operation of the memory means. (The above address generators may be composed of counters, for example, a 74LS163 IC chip.)

The above first selector comprises a first multiplexer using the field selection signal to selectively supply the write and read addresses supplied from the address generating means to the memory means, and a second multiplexer using the output of the first inverting means to selectively supply the write and read addresses supplied from the address generating means to the memory means.

The above first logic means comprises a first AND gate for logically multiplying the output of the frequency-divider in the mode selector by the field selection signal, and a second AND gate for logically multiplying the output of the comparator in the mode selector by the field selection signal.

The above second inverting means comprises inverters for inverting the outputs of the AND gates in the first logic means.

The above second logic means comprises a third AND gate for logically multiplying the output of the frequency-divider in the mode selector by the output of one inverter in the second inverting means, and a fourth AND gate for logically multiplying the output of the comparator in the mode selector by the output of the other inverter in the second inverting means.

The above second selector comprises a third multiplexer for receiving the output of the first logic means and the field selection signal so as to selectively output the inputs thereto, and a fourth multiplexer for receiving the outputs of the second logic means and the first inverting means so as to selectively output the inputs thereto.

The above memory means comprises a first memory for storing the picture data supplied from the inner decoder in a region which is assigned by the write address supplied from the first selector, or generating the picture data stored in a region which is assigned by the read address, in response to one read/write enable signal supplied from the second selector, and a second memory for storing the picture data supplied from the inner decoder in a region which is assigned by the write address supplied from the first selector or generating the picture data stored in a region which is assigned by the read address, in response to the other read/write enable signal supplied from the second selector.

The above third selector may be simply composed of a multiplexer.

The present invention having the above constitution reproduces periodically one frame of data from the tape in a digital VTR during high speed reproduction to obtain a still picture, and then maintains the picture constitution state until a next period for constituting a new picture.

If the above operations are repeatedly performed during the high speed reproduction of a tape, a clean still picture can be obtained which is varied by a predetermined time interval, for example, one or two seconds. This interval is determined by a multiple speed which is a reproduction speed faster than normal reproduction, by ten times, twenty times, etc.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

A preferred embodiment of the present invention will be described below in detail with reference to the accompanying drawings.

Figure 1:
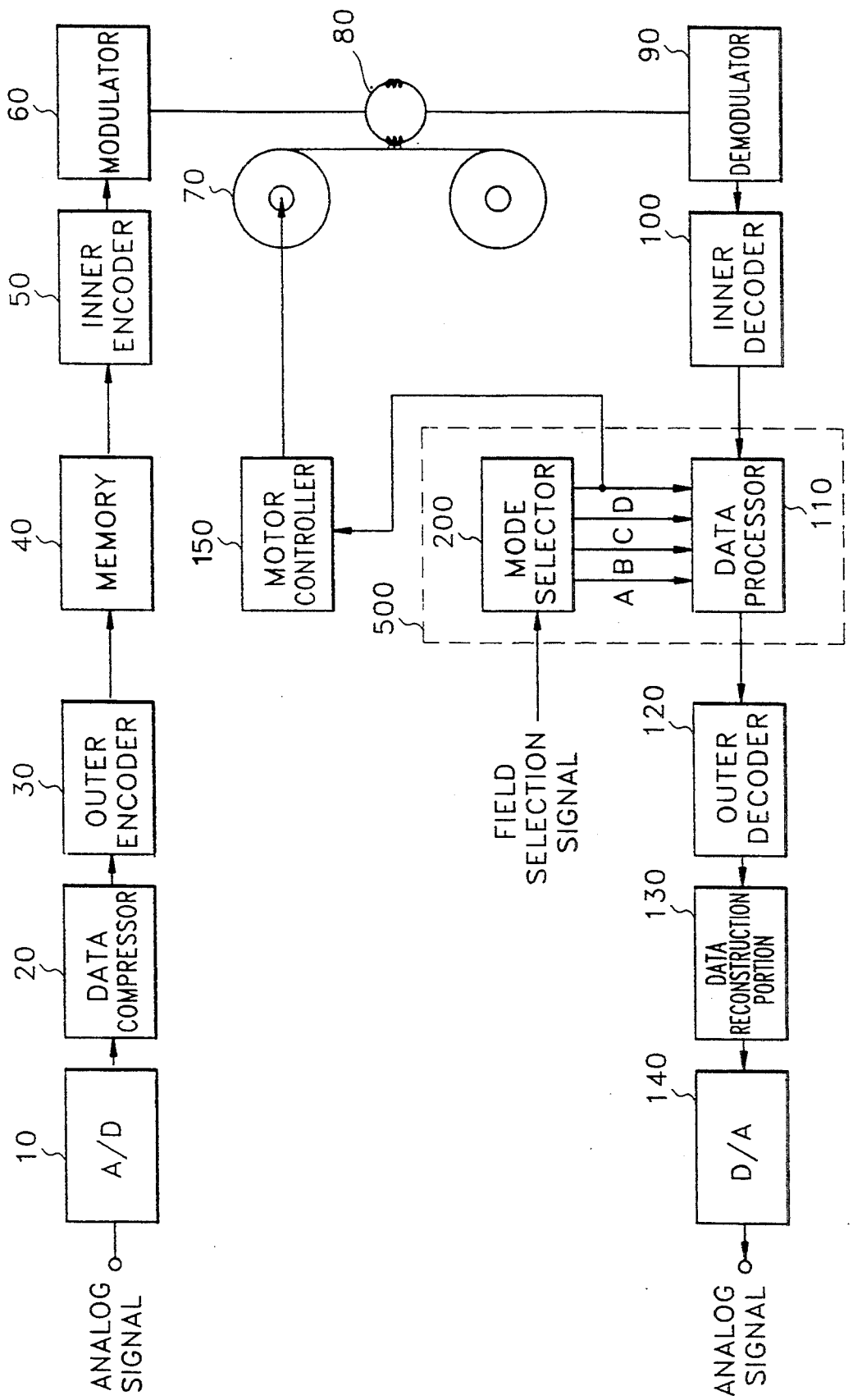
FIG. 1 is a block diagram of a digital VTR system adopting a picture search control apparatus according to the present invention.

With reference to FIG. 1, a conventional recording or reproduction procedure in connection with a digital VTR will be described below. Here, reference numerals 10 through 60 collectively represent a recorder for converting a video signal into a data signal adapted for recording on tape, 70 denotes a capstan motor for running a tape, 80 denotes a head, 90 through 140 are a reproducer, 150 is a motor controller, and 500 is a picture search control apparatus according to the present invention.

First of all, a procedure for recording the input picture signal on the tape will be described below.

An analog video signal supplied from a television or other video media is converted into a digital picture data signal in A/D converter 10. Data compressor 20 compresses the digital picture data signal supplied from A/D converter 10. The thus-produced picture data passes through outer decoder 30, memory 40 and inner decoder 50, in sequence, whereby an error correction bit is added for correcting errors which may be generated during a recording procedure. Modulator 60 converts the picture data including the error correction bit into a signal adapted for recording on tape via head 80. By checking the error correction bit of the picture data recorded on the tape, errors generated during the recording or reproducing stage can be corrected.

It should be appreciated that reproducing the recorded picture data recorded uses the reverse procedure of that for the above-described recording of the picture signal. Accordingly, when the picture data recorded on the tape is reproduced, the picture data read out by head 80 is demodulated in demodulator 90. Thereafter, errors are corrected when the demodulated picture data passes through inner decoder 100 and outer decoder 120. In data reconstruction portion 130, the error-corrected picture data is reconstructed into the pre-compression picture data signal. The thus-reconstructed picture data signal passes through D/A converter 140 so as to be converted back into an analog picture signal which constitutes a reproduced picture.

Figure 2:
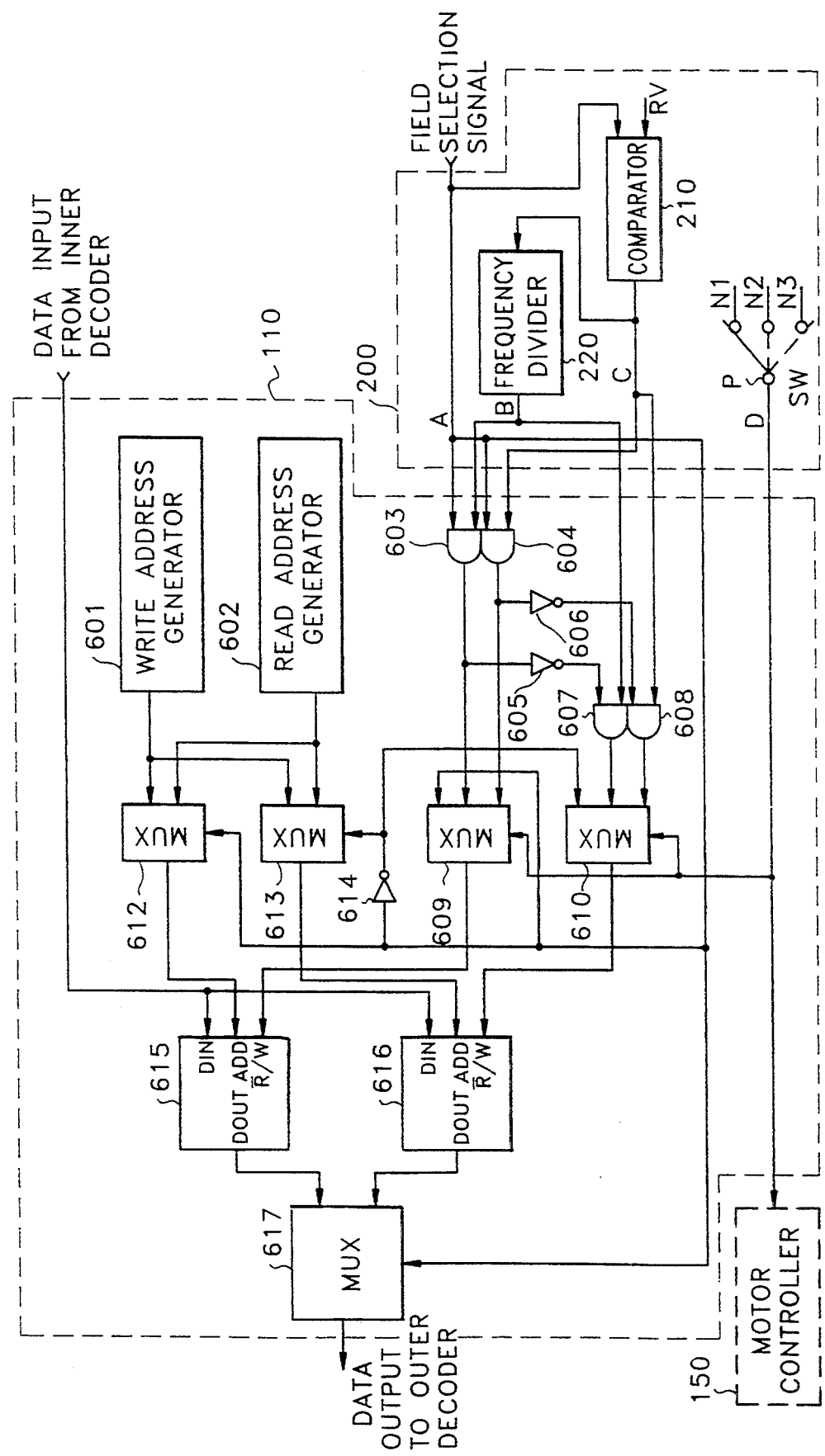
FIG. 2 is a block diagram of one preferred embodiment of the present invention.

FIG. 2 shows a detailed circuit diagram of picture search control apparatus 500 shown in FIG. 1 according to the present invention.

As with any NTSC television signal, there are 525 horizontal scanning lines which constitute one frame. One frame is divided into two fields of 262.5 lines each to prevent a "flicker" phenomenon which would occur if all 525 lines were sequentially scanned from top to bottom in 1/30th of a second. Accordingly, an interlaced scanning technique of odd and even fields is carried out for each field signal every 1/60th of a second.

When a picture signal divided into fields as above is recorded on tracks of a tape in a conventional VTR, a recording method called non-division or non-segment recording is used, which puts one field on each track. Another method, called divisional or segmented recording, separately records one field signal on a variety of tracks. In an example of the present invention, the segment type for recording one field signal on two tracks is used.

Figure 3A:
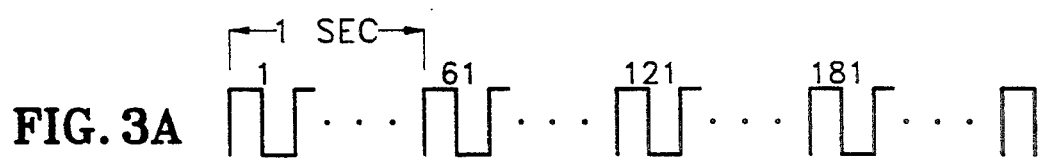
FIGS. 3A through 3I show waveform diagrams for explaining the operation of the present invention.
Figure 3B:

In FIG. 3A, every other interval is given a value of "1" and corresponds to an odd field, while those having a value of "0" correspond to even fields. That is, the signal shown in FIG. 3A is a signal for discriminating the field signal into odd and even fields.

The present invention comprises mainly two portions. One is mode selector 200 for selecting a reproduction speed, that is, a reproduction mode receiving the field selection signal and producing the primary control signals necessary for processing the data. The other is data processor 110 for receiving the data supplied from inner decoder 100 of FIG. 1 and for processing the received data in correspondence to the selected mode under the control of the primary control signals supplied from mode selector 200 or their combined control signals, and for supplying the processed data to outer decoder 120 of FIG. 1.

The above mode selector 200 comprises a mode selection switch SW for selecting the normal reproduction speed (N1) or one of a plurality of multiple speeds represented by N2 and N3, a comparator 210 for receiving the field selection signal and comparing it with the reference value (RV) signal being 1/60th the frequency of the field selection signal, to generate a predetermined clock signal only when the above two signals are the same, and a frequency divider 220 which is connected in the output of comparator 210.

A fixed contact P of mode selection switch SW in mode selector 200 is connected to motor controller 150 of FIG. 1. Accordingly, the speed of capstan motor 70 of FIG. 1 can be controlled in correspondence to the mode selected by mode selection switch SW.

On the other hand, data processor 110 comprises: first and second memories 615 and 616 which are memory means for storing the data supplied from inner decoder 100 (FIG. 1); a write address generator 601 which generates an address for assigning a memory access location for writing the data into first and second memories 615 and 616; a read address generator 602 which generates an address for assigning a memory access location for reading the stored data; a first multiplexer 612 for selecting one among the address signals supplied from write address generator 601 and read address generator 602, according to the field selection signal, and supplying the selected address signal to first memory 615; a second multiplexer 613 for performing the same function as that of first multiplexer 612, and supplying the selected address signal to second memory 616 according to the inverted field selection signal; a first AND gate 603 for logically multiplying the field selection signal by the output of frequency divider 220; a second AND gate 604 for logically multiplying the field selection signal by the output of comparator 210; first and second inverters 605 and 606 for inverting the outputs of first and second AND gates 603 and 604; a third AND gate 607 for logically multiplying the output of first inverter 605 by the output of frequency divider 220; a fourth AND gate 608 for logically multiplying the output of second inverter 606 by the output of comparator 210; a third multiplexer 609 for selecting one among the field selection signal and the outputs of first and second AND gates 603 and 604, according to a control signal D corresponding to the mode selection of mode selector 200, and supplying the selected signal to first memory 615 as a read/write enable signal; a third inverter 614 for inverting the field selection signal; a fourth multiplexer 610 for selecting one among the inverted field selection signal (the output of third inverter 614) and the outputs of third and fourth AND gates 607 and 608, according to a control signal D corresponding to the mode selection of mode selector 200, and supplying the selected signal to second memory 616 as another read/write enable signal; and a fifth multiplexer 617 for selecting one among the output data signals of first and second memories 615 and 616, according to the field selection signal, and supplying the selected signal to outer decoder 120 (FIG. 1).

Figure 3C:
Figure 3D:
Figure 3E:
Figure 3F:
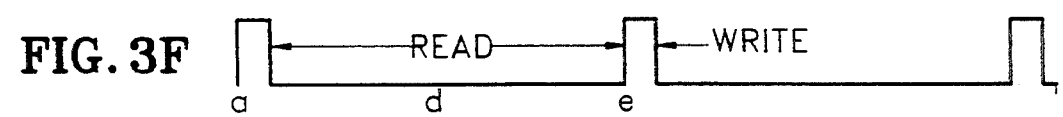
Figure 3G:
Figure 3H:
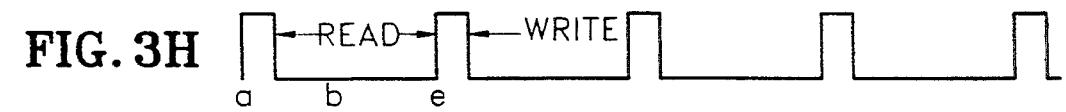
Figure 3I:
Figure 4:
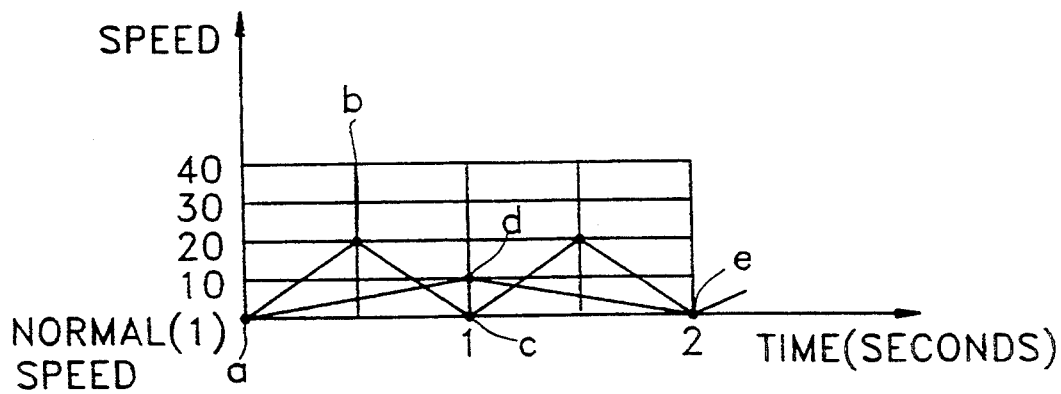
FIG. 4 is a graph for explaining a variation of the motor speed according to the reproduction mode.

Referring to FIGS. 3 through 5, the operation of the present invention having the above constitution will be described below in more detail.

First, referring to FIGS. 4 and 5, the variation of the revolution speed of capstan motor 70 of FIG. 1 for running the tape according to the respective high speed reproduction modes will be described below.

For example, if a 10-times speed reproduction mode (ten times the speed of the motor during normal reproduction) is selected, the motor revolution speed is linearly increased from the starting point "a" as shown in FIG. 4. After the motor's revolution speed increases to a peak point "d", it is linearly decreased therefrom. After, say, two seconds, the revolution speed reaches an end point "e", and accordingly, the motor rotation returns to the normal reproduction speed. The area of a triangle formed by points "a", "d" and "e" corresponds to the tape's running distance over two seconds.

Figure 5A:
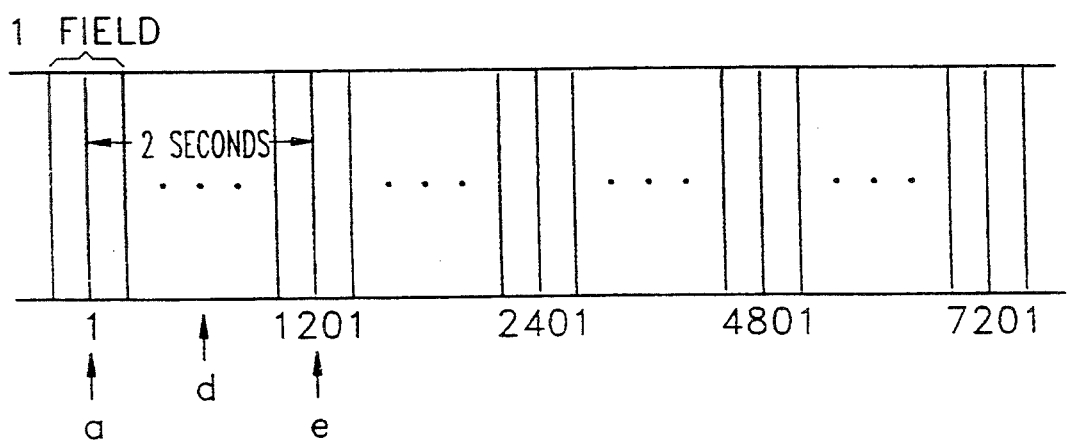
FIGS. 5A and 5B illustrate the running speed of the head on the tape according to the reproduction mode.

In FIG. 5A, given the selection of a 10-times mode, a two-second tape running distance is shown in units of actual data fields. Here, it can be seen that physically, 600 fields per second, in other words, a total of 1,200 data fields, are read for two seconds through the head.

For a 20-times speed reproduction mode (twenty times the speed of the motor during normal reproduction), the motor revolution speed is linearly increased from the starting point "a" as shown in FIG. 4. After the motor's revolution speed increases to a peak point "b", it is linearly decreased therefrom. The revolution speed then reaches an end point "c", and accordingly, the motor rotation returns to the normal reproduction speed. The area of a triangle formed by points "a", "b" and "c" corresponds to the tape's running distance over one second.

Figure 5B:
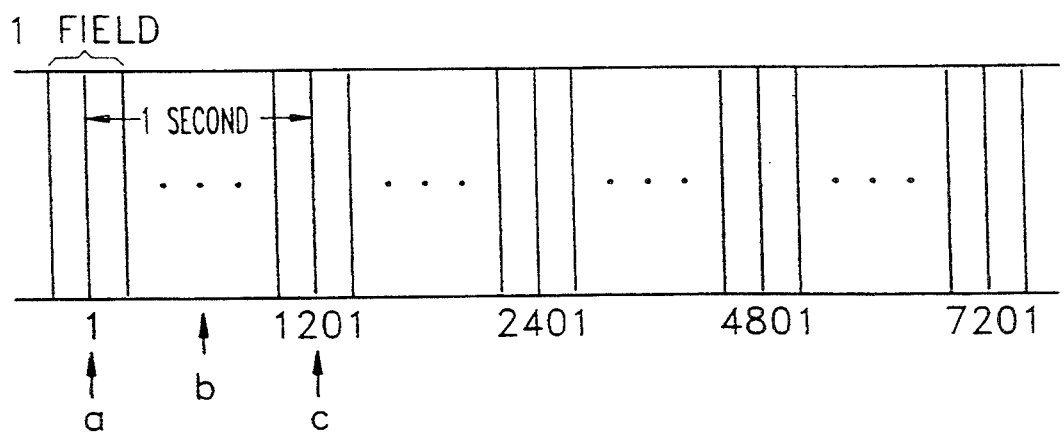

In FIG. 5B, given the selection of a 20-times mode, a one-second tape running distance is shown in units of actual data fields. Here, it can be seen that physically, a data field of 1,200 fields per second is read through the head.

As described above, during the multiple speed reproduction mode, for example 10 or 20 times, the tape running speed (or the motor revolution speed) goes from a normal speed to a high speed and then to a normal speed and back to a high speed, to continue in this manner indefinitely. Accordingly, only when the tape running speed changes from the high reproduction speed to the normal reproduction speed, do the head scanning track and the data track on the tape coincide with each other.

Thus, when the tape running speed is the normal reproduction speed, the data recorded on the tape is read to constitute one still picture. Since the tape running speed (or the motor revolution speed) changes from the normal reproduction speed back to the high reproduction speed again, the previously constituted still picture is maintained until the tape running speed reaches the next normal reproduction speed, and when this happens, new data is read from the tape to constitute a new still picture. Thus, by repeating the above reproduction operation during the high reproduction procedure, a stable and cleanly reproduced picture can be obtained.

From now on, referring to FIGS. 2 and 3A through 3I, the reproduction procedure of the above-described present invention will be specifically described.

In FIG. 2, when a particular reproduction mode is selected by mode selection switch SW in mode selector 200, a control signal D which controls capstan motor 70 of FIG. 1 in correspondence to the selected reproduction mode is supplied to motor controller 150 of FIG. 1. As a result, the motor revolution speed is set to a speed corresponding to the reproduction mode selected by mode selection switch SW. The field selection signal (FIG. 3A) input to mode selector 200 is supplied to comparator 210 and then compared with a predetermined reference value (RV) signal whose frequency is 1/60th that of the field selection signal. Here, comparator 210 compares the input field selection signal with the RV signal, a pulse signal having a waveform shown in FIG. 3C. The output of comparator 210 is divided by two in frequency divider 220. Thus, the output of frequency divider 220 (FIG. 3B) is half the frequency of the output of comparator 210 (FIG. 3C).

As described above, mode selector 200 receives the field selection signal, and produces primary control signals A, B and C for controlling data processor 110, and a control signal D for controlling the motor revolution speed according to the multiple speed mode.

Data processor 110 receives and stores the picture data supplied from inner decoder 100 of FIG. 1 under the control of mode selector 200, and then generates the stored data during a time interval appropriate for constituting the picture corresponding to the selected reproduction mode. First and second memories 615 and 616 receive and store the picture data supplied from inner decoder 100 only when the motor rotates at the normal reproduction speed. Thus, when the motor rotates at a speed higher than the normal speed, first and second memories 615 and 616 do not receive the data supplied from inner decoder 100, but maintain the data as received under normal rotation speed conditions.

Write address generator 601 generates an address for assigning the memory access location of the memory in which the picture data is written. Read address generator 602 generates an address for assigning the memory access location of the memory in which the data to be read is stored.

First multiplexer 612 which is controlled by the field selection signal selects one among the address signals supplied from write address generator 601 and read address generator 602 and supplies the selected address signal to first memory 615 as the write address or the read address.

On the other hand, second multiplexer 613 which is controlled by the inverted field selection signal selects one among the address signals supplied from write address generator 601 and read address generator 602 and supplies the selected address signal to second memory 616 as the write address or the read address.

First AND gate 603 logically multiplies the field selection signal (FIG. 3A) by the output of frequency divider 220 (FIG. 3B) and generates a pulse having the waveform as shown in FIG. 3F.

Second AND gate 604 logically multiplies the field selection signal (FIG. 3A) by the output of comparator 210 (FIG. 3C) and generates a pulse having the waveform as shown in FIG. 3H.

The outputs of first and second AND gates 603 and 604 are supplied to third multiplexer 609, together with the field selection signal.

Third AND gate 607 logically multiplies the output of first inverter 605 for inverting the output of first AND gate 603 (FIG. 3F) by the output of frequency divider 220 (FIG. 3B), and generates a pulse signal having the waveform shown in FIG. 3G.

Fourth AND gate 608 logically multiplies the output of second inverter 606 for inverting the output of second AND gate 604 (FIG. 3H) by the output of comparator 210 (FIG. 3C), and generates a pulse signal having the waveform shown in FIG. 3I.

The outputs of third and fourth AND gates 607 and 608 are supplied to fourth multiplexer 610, together with the output of third inverter 614 for inverting the field selection signal.

For the normal reproduction mode, third and fourth multiplexers 609 and 610 which are respectively controlled by a control signal D according to the mode selection, selects the field selection signal and the inverted field selection signal, respectively, and supplies the selected signals to first and second memories 615 and 616 as a write-enable or read-enable signals. Here, for example, when the field selection signal supplied to first memory 615 is a logic low, a memory read operation is performed, and when it is high, a memory write operation is performed.

When the outputs of multiplexers 609 and 610 are "1" and "0", respectively, memory 615 will write data from the inner decoder and memory 616 will have data read out therefrom. The reverse occurs when the outputs of multiplexers 609 and 610 are "0" and "1", respectively. In other words, when a read operation is performed in first memory 615, a write operation is performed in second memory 616, and conversely, when a write operation is performed in first memory 615, a read operation is performed in second memory 616.

For the 10-times speed reproduction mode, third and fourth multiplexers 609 and 610 are controlled by control signal D to select the signals shown in FIGS. 3F and 3G, respectively, and supplies the selected signals to first and second memories 615 and 616 as the write-enable or read-enable signal.

When the multiple speed reproduction is started, the memory read operation for constituting the still picture is performed in first and second memories 615 and 616 by the signal shown in FIGS. 3F and 3G. In this case, the tape running speed starts to increase, as shown in FIG. 4.

Since the VTR is in the normal reproduction mode before the 10-times speed reproduction mode starts, the output data of the memory among first and second memories 615 and 616 (where a memory write operation was performed, just before the multiple speed reproduction mode starts) is selected by the fifth multiplexer 617 which is controlled by the field selection signal.

In this manner, during the reproduction mode functioning just before a multiple reproduction mode, that is, in the normal reproduction mode, the picture data is continuously read from the memory in which the final memory write operation was performed to constitute the still picture. Thereafter, the constituted still picture is maintained until the tape running speed passes a peak point "d" shown in FIG. 4 and reaches an end point "e" (that is, returns back to the normal reproduction mode). Then, when the tape running speed (or the motor revolution speed) again reaches its normal reproduction speed, the signals shown in FIGS. 3F and 3G go high (a logic "1"), and accordingly the memory operation mode is changed into the write operation mode. In this case, the new picture data read through the head is stored in the first or second memory 615 or 616. When the tape running speed again increases, the memory read operation is performed by the signals shown in FIGS. 3F and 3G in first and second memories 615 and 616. Such a memory operation is performed until the tape running speed again reaches the normal reproduction speed.

The above-described operations are repeatedly performed during the high speed reproduction, thereby obtaining a clean still picture. Also, the 20-times reproduction is performed using the same operating principle as the 10-times speed reproduction mode, except that the duration of the still picture is a half that for 10-times reproduction. Thus, if the duration of a displayed still picture is, for example, two seconds in the 10-times speed reproduction mode, the duration is one second for 20-times reproduction.

Figure 6:
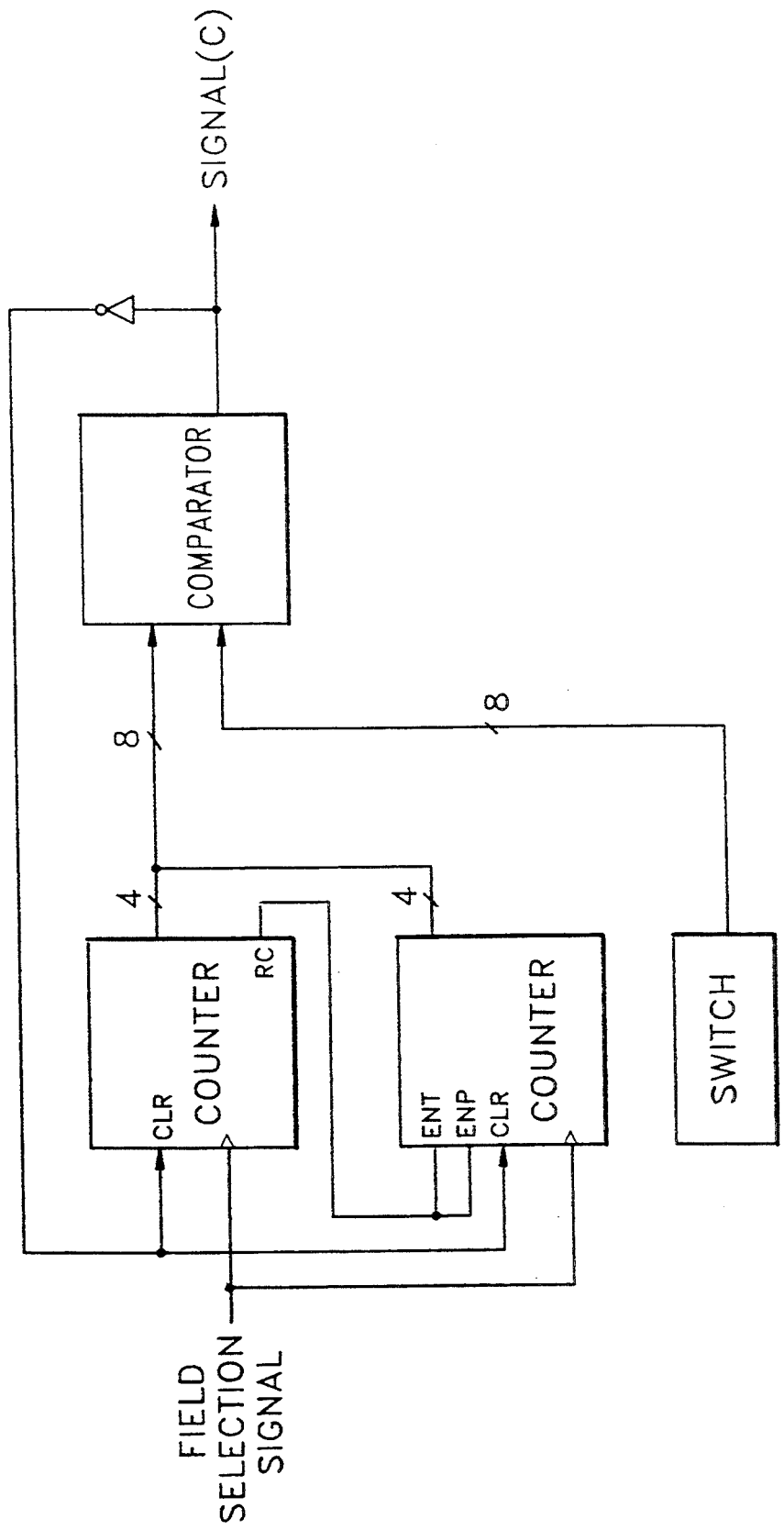
FIG. 6 is a block diagram of a preferred embodiment of the comparator of FIG. 2.

FIG. 6 shows one embodiment of comparator 210 shown in FIG. 2, which comprise one comparator (for example, a 74LS688 IC chip) and two counters (for example, a 74LS163 IC chip). In FIG. 6, the signal supplied from a switch block corresponds to the reference value (RV) signal of FIG. 2. A comparator block compares the field selection signal counted by counter blocks with the RV signal supplied from the switch block. Here, given a selected reproduction mode, the signal selected by the switch block has 1/60th the frequency of the field selection signal (among 1/60, 1/120 and 1/180), and the output of the comparator block goes high (a logic "1") every sixtieth pulse of the field selection signal. That is, when the field selection signal coincides with the reference value signal, a clock signal C shown in FIG. 3C is generated.

Figure 7:
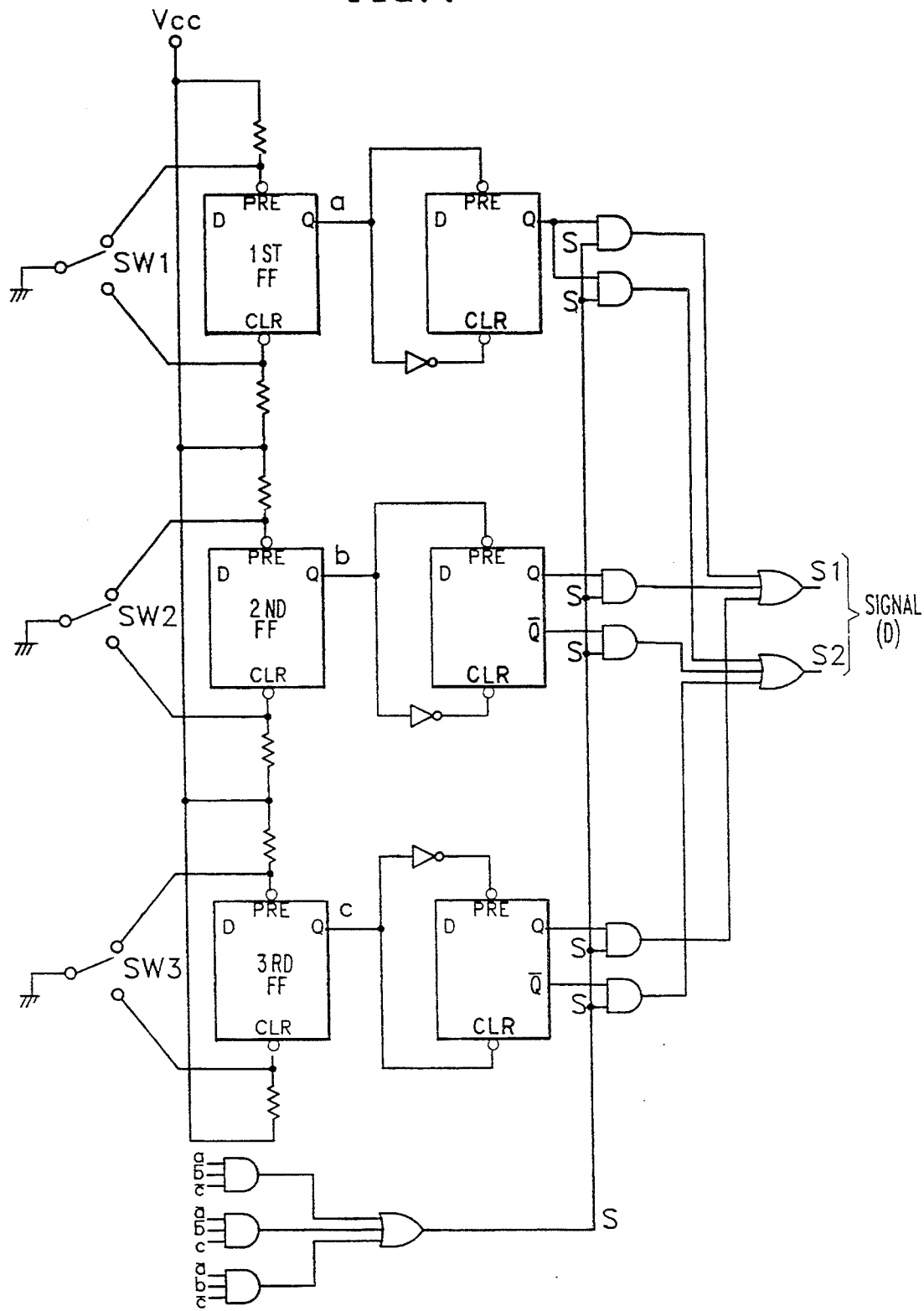
FIG. 7 is a partially block diagram and partially schematic diagram of a preferred embodiment of the mode selection switch of the mode selector of FIG. 2.

FIG. 7 shows one embodiment of the mode selection switch SW (FIG. 2) for generating a signal D. The switch comprises a plurality of counters (for example, 74LS74 ICs), and a plurality of AND gates and OR gates. Accordingly, if one reproduction mode is selected by switch SW1, SW2 or SW3, two mode selection signals S1 and S2 are produced. In other words, in FIG. 7, if the preset terminal of a first flip-flop (FF) only is pulled to ground via switch SW1 (denoted as N1 in FIG. 2 which corresponds to the normal reproduction mode) with the other switches SW2 and SW3 being in the opposite state, outputs S1 and S2 become a logic "1" and "1," respectively. Likewise, if the preset terminal of a second FF only is pulled to ground via switch SW2 (denoted as N2 in FIG. 2 which corresponds to the ten-times reproduction mode), the logic states of outputs S1 and S2 become "1" and "0," and if the preset terminal of a third FF only is pulled to ground via switch SW3 (denoted as N3 in FIG. 2 which corresponds to the twenty-times reproduction mode), the outputs become "0" and "1," respectively.

As described above, according to the present invention, when a high speed reproduction is performed in a digital VTR, a clean still-motion picture can be viewed on demand. Accordingly, not only can the location of a desired picture be easily searched, but also the contribution to eye fatigue due to the fast movement of the picture can be eliminated.

While the present invention is disclosed and described with reference to a preferred embodiment, it is well appreciated that any person who is skilled in the art to which the present invention pertains can variously modify the constitution and the detailed matter of the invention, without departing from the spirit of this disclosure and the scope of the appended claims. For example, the magnitude and class of the multiple speeds, as well as the duration of the still picture, can be properly adjusted as necessary.

What is claimed is:

1. A picture search control apparatus for use in a digital video tape recorder having a capstan motor for running a tape, a motor controller for controlling the capstan motor, and a reproducer including a demodulator for demodulating compressed data signals read out from the tape via at least one head, an inner decoder for decoding the data signals supplied from the demodulator and checking whether errors are generated, to correct the errors within a correction capability and to add an error flag in case of the existence of errors beyond the correction capability, an outer decoder for correcting errors in the data signals supplied from the inner decoder with respect to an outer code block according to the error flag, a data reconstruction portion for reconstructing the compressed data signal supplied from the outer decoder into an original state, and a digital-to-analog converter for converting the digital picture data signal supplied from the data reconstruction portion into an analog picture signal, said picture search control apparatus comprising:

a mode selector receiving a field selection signal for selecting a reproduction mode, controlling the motor controller in response to the selected reproduction mode, and for producing a plurality of primary control signals necessary for delaying the data signals; and a data processor logically combining said primary control signals supplied from said mode selector to produce a plurality of control signals controlling timing of an output of the data signals supplied from the inner decoder so as to provide a still picture in correspondence to the selected reproduction mode and supplying the delayed data signals to the outer decoder to permit subsequent generation of said still picture.

2. The picture search control apparatus according to claim 1, wherein said mode selector comprises:
   a mode selection switch for selecting a reproduction mode among a plurality of reproduction modes,
   a comparator comparing the field selection signal with a predetermined reference value signal and generating a predetermined pulse signal only when said field selection signal and said reference value signal coincide, and
   a frequency divider frequency-dividing the output of said comparator so as to generate at least one of said primary control signals.

3. The picture search control apparatus according to claim 2, wherein said reference value signal is approximately one-sixtieth of the frequency of the field selection signal.

4. The picture search control apparatus according to claim 2, wherein said frequency divider divides the frequency of the output of said comparator by two.

5. The picture search control apparatus according to claim 1, wherein said data processor comprises:
   a memory storing the data signals supplied from the inner decoder,
   an address generator generating a write address and a read address for said memory,
   a first invertor for inverting the field selection signal,
   a first selector for receiving the write address and the read address for said memory supplied from said address generator, said read address and said write address being selectively supplied to said memory by the field selection signal and the output of said first invertor,
   a first logic circuit for logically multiplying the outputs of a comparator and a frequency divider in said mode selector by the field selection signal,
   a second inventor for inverting the outputs of said first logic circuit,
   a second logic circuit for logically multiplying the outputs of said comparator and said frequency divider by the outputs of said second invertor,
   a second selector receiving the filed selection signal, the output of said first invertor and the outputs of said first logic circuit and said second logic circuit so as to permit said read address and said write address to be selectively supplied to said memory by a control signal supplied from a mode selection switch among said plurality of primary control signals, and
   a third selector for receiving the data signals supplied from said memory so as to be selectively supplied to the outer decoder by said field selection signal.

6. The picture search control apparatus according to claim 5, wherein said address generator comprises:
   a write address generator for generating an address which assigns an access location for a write operation of said memory, and
   a read address generator for generating an address which assigns an access location for a read operation of said memory.

7. The picture search control apparatus according to claim 5, wherein said first selector comprises:
   a first multiplexer using the field selection signal to selectively supply the write and read addresses supplied from said address generator to said memory, and
   a second multiplexer using the output of said first invertor to selectively supply the write and read addresses supplied from said address generator to said memory.

8. The picture search control apparatus according to claim 5, wherein said first logic circuit comprises:
   a first AND gate for logically multiplying the output of said frequency divider in said mode selector by the field selection signal, and
   a second AND gate for logically multiplying the output of said comparator in said mode selector by the field selection signal.

9. The picture search control apparatus according to claim 5, wherein said second invertor comprises a first inverting element and a second inverting element of respectively inverting the outputs of said first and second AND gates in said first logic circuit.

10. The picture search control apparatus according to claim 5, wherein said second logic circuit comprises:
    a third AND gate for logically multiplying the output of said frequency divider in said mode selector by the output of said first inverter in said second invertor, and
    a fourth AND gate for logically multiplying the output of said comparator in said mode selector by the output of said second inverter in said second invertor.

11. The picture search control apparatus according to claim 5, wherein said second selector comprises:
    a third multiplexer for selectively providing the output of said first logic circuit and the field selection signal, and
    a fourth multiplexer for selectively providing the outputs of said second logic circuit and said first invertor.

12. The picture search control apparatus according to claim 5, wherein said memory comprises:
    a first memory for selectively storing the picture data supplied from the inner decoder in a region assigned by the write address supplied from said first selector and generating the picture data stored in a region assigned by the read address, in response to a read/write enable signal supplied from said second selector, and
    a second memory for selectively storing the picture data supplied from the inner decoder in a region assigned by the write address supplied from said first selector and generating the picture data stored in a region assigned by the read address, in response to another read/write enable signal supplied from said second selector.

13. The picture search control apparatus according to claim 5, wherein said third selector comprises a multiplexer.

14. A picture search and selection apparatus for a VTR having a tape containing recorded picture signals ordinarily played back at normal speeds read by a read/write head and having a capstan motor, a motor controller for controlling the capstan motor, and a reproducer including a demodulator for demodulating compressed data signals read out from the tape, an inner decoder for decoding the data signals supplied from the demodulator, an outer decoder for correcting errors in the data signals supplied from the inner decoder with respect to an outer code block, a data reconstruction portion for reconstructing the compressed data signal supplied from the outer decoder into an original state, a digital-to-analog converter for generating an analog picture signal from the digital picture data signal supplied from the data reconstruction portion, a mode selector receiving a field selection signal for selecting a reproduction mode, controlling the motor controller in response to the selected reproduction mode, and for producing a plurality of primary control signals necessary for delaying the data signals, and a data processor logically combining the primary control signals supplied from said mode selector to produce a plurality of control signals controlling timing of an output of the data signals supplied from the inner decoder so as to provide a still picture in correspondence to the selected reproduction mode and supplying the delayed data signals to the outer decoder to permit subsequent generation of said still picture, said apparatus comprising:

- means for playing back said tape in a fast reproduction mode by linearly varying tape speed between normal speed and n times normal speed on a continuous and periodic basis defining a periodic cycle in response to operation of said mode selector,
- a memory for storing said picture signals read from said tape via said inner decoder and for outputting said picture signals for display via said outer decoder, and
- a storage and read out controller responsive to said control signals for writing in said memory single picture signals that are read by said read/write head each time said tape speed reaches normal speed in said periodic cycle and for outputting said single picture signals from said memory repeatedly until a subsequent single picture signal is written into said memory.

15. The apparatus of claim 14, wherein said apparatus further comprises:

- a mode selector for selecting peak speed corresponding to said n times normal speed and period for tape reproduction speed, each of said peak speed and said period being selected such that a path read by said read/write head coincides with at least one of recorded tracks of data on said tape only during that part of said periodic cycle when the tape is at normal speed.

16. The apparatus of claim 15, wherein said memory comprises two single field memories for storing and reproducing said picture signals corresponding to two fields of a single frame.

17. A picture search and selection method for a VTR having a tape containing recorded picture signals ordinarily played back at a normal speed and read by a read/write head and having a capstan motor, a motor controller for controlling the capstan motor, and a reproducer including a demodulator for demodulating compressed data signals read out from the tape, an inner decoder for decoding the data signals supplied from the demodulator, an outer decoder for correcting errors in the data signals supplied from the inner decoder with respect to an outer code block, a data reconstruction portion for reconstructing the compressed data signal supplied from the outer decoder into an original state, a digital-to-analog converter for generating an analog picture signal from the digital picture data signal supplied from the data reconstruction portion, a mode selector receiving a field selection signal for selecting a reproduction mode, controlling the motor controller in response to the selected reproduction mode, and for producing a plurality of primary control signals necessary for delaying the data signals, and a data processor logically combining the primary control signals supplied from said mode selector to produce a plurality of control signals controlling timing of an output of the data signals supplied from the inner decoder so as to provide a still picture in correspondence to the selected reproduction mode and supplying the delayed data signals to the outer decoder to permit subsequent generation of said still picture, said method comprising the steps of:

- playing back said tape in a fast reproduction mode by linearly varying tape speed between said normal speed and n times normal speed repeatedly at regular, intervals by controlling said motor controller responsive to said mode selector to thereby controls said capstan motor,
- storing in a memory said picture signals read from said tape via said inner decoder and outputting said picture signals for display via said outer decoder, and
- writing in said memory a single one of said picture signals read by said read/write head each time said tape speed reaches normal speed in a respective one of said intervals and outputting said single picture signals from said memory repeatedly until a subsequent single picture signal is written into said memory responsive to the control signals.

18. The method of claim 17, further comprising the step of:

- selecting the n times normal speed and a duration of one of said intervals to thereby select tape reproduction speed,
- whereby each of said n times normal speed and said intervals are selected such that the track of said read/write head coincides with the tracks of data on said tape only during that part of said intervals when the tape speed is equal to said normal speed.

* * * * *